UNITED STATES PATENT OFFICE.

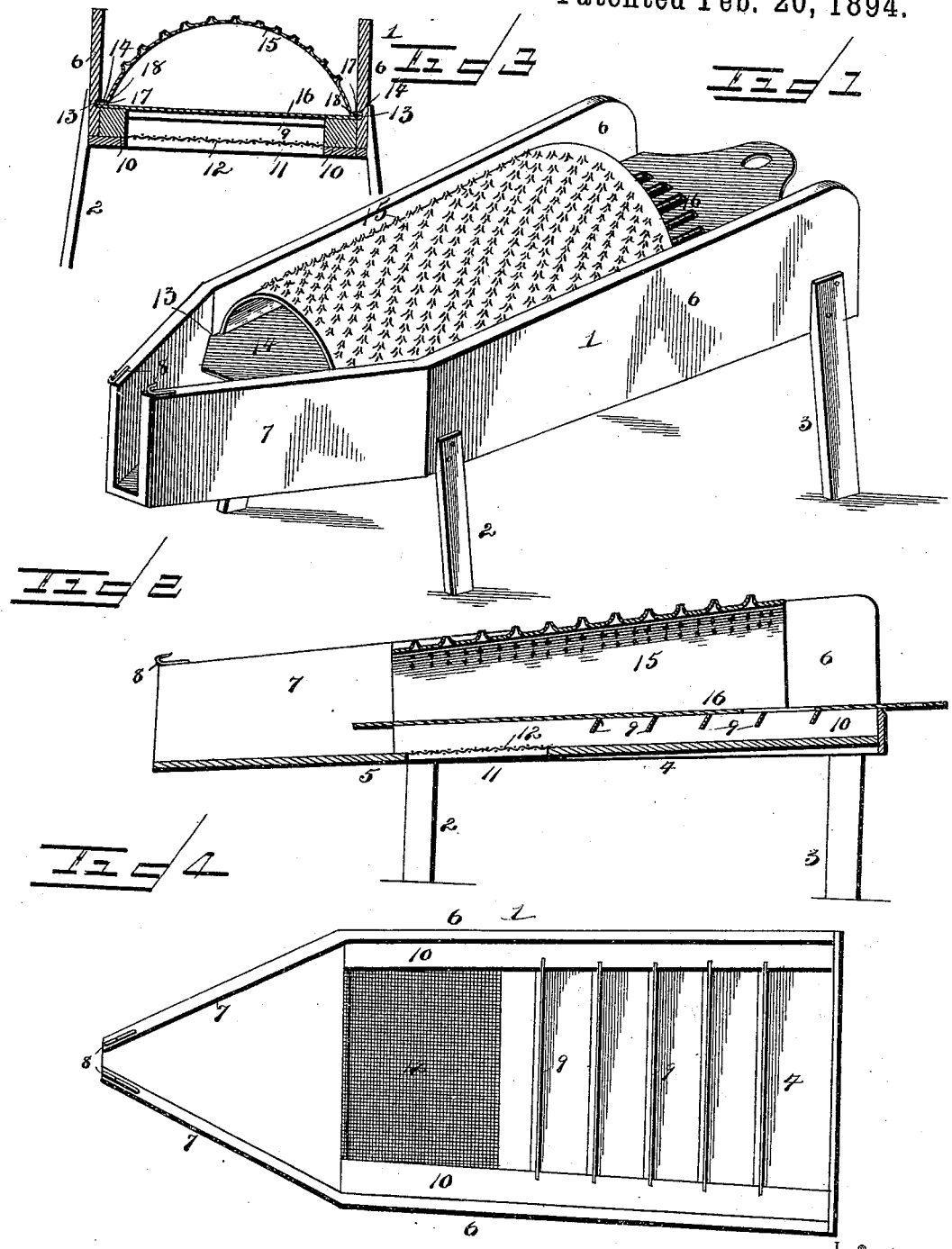

WILLIAM E. CROCKETT, OF SULPHUR BLUFF, TEXAS.

CONVERTIBLE CORN SHELLER AND GRATER.

SPECIFICATION forming part of Letters Patent No. 515,074, dated February 20, 1894.

Application filed June 30, 1893. Serial No. 479,274. (No model.)

*To all whom it may concern:*

Be it known that I, WILLIAM E. CROCKETT, a citizen of the United States, residing at Sulphur Bluff, in the county of Hopkins and State of Texas, have invented a new and useful Convertible Corn Sheller and Grater, of which the following is a specification.

The invention relates to improvements in corn shellers and graters.

The object of the present invention is to provide a simple and inexpensive convertible corn sheller and grater, which will enable, in shelling corn, a sack or other receptacle to be filled without spilling the shelled corn, and which will not become clogged.

A further object of the invention is to separate dust and similar trash from the shelled corn, and to enable the grater, which is adapted for grating unripe corn, potatoes and the like, to be readily removed and separated for cleaning.

The invention consists in the construction and novel combination and arrangement of parts hereinafter fully described, illustrated in the accompanying drawings and pointed out in the claims hereto appended.

In the drawings—Figure 1 is a perspective view of a corn sheller and grater constructed in accordance with this invention, the grater being in operative position. Fig. 2 is a longitudinal sectional view. Fig. 3 is a transverse sectional view. Fig. 4 is a plan view of the corn sheller, the grater being removed.

Like numerals of reference indicate corresponding parts in all the figures of the drawings.

1 designates an inclined trough, supported by legs 2 and 3 and composed of a bottom 4 having a tapered lower end or portion 5, and sides 6 having converging lower front portions 7, which form a contracted mouth or discharge opening, and which are adapted for directing the shelled corn or other material into a bag or other receptacle. A bag (not shown) is adapted to be readily attached to the front of the trough by means of hooks 8 secured to the upper edges of the converging portions of the sides of the trough.

The corn is shelled by means of inclined transversely disposed blades 9, which are arranged at intervals and secured in inclined kerfs of supporting bars 10 secured to the bottom on the upper face thereof adjacent to the sides 6. The blades 9 are located above the bottom 4 of the trough to form a space to provide a free passageway for the shelled corn to prevent the corn sheller clogging. The bottom of the trough is provided with a rectangular or other shaped opening 11, which is covered by gauze 12 or other construction of screen, which will permit dust and similar light trash to separate readily from the shelled corn and fall beneath the trough.

The sides 6 are provided at their inner faces with longitudinal ways 13, which receive laterally extending flanges of a grater 14, which is detachably arranged in the trough and supported by the bars 10. The grater consists of a curved top portion 15, which is provided with a grating surface, and a lower portion or back plate 16, which has its longitudinal edges bent on themselves to form ways 17 to receive laterally extending flanges 18 of the upper portion or front 15. The ways 17 of the plate 16 form the laterally extending flanges which fit in the ways of the trough. The front of the bottom plate 16 is cut away at the sides to conform to the converging portions 7 of the trough; and the said converging portions 7 form stops for the grater.

It will be apparent that the corn sheller is adapted to be continuously used without liability of becoming clogged by the shelled corn that the latter may be directed into a bag or other receptacle without being spilled, and that the grater, which is adapted for grating unripe corn, potatoes and similar articles, may be readily removed from the trough and separated for cleaning.

Changes in the form, proportion and the minor details of construction may be resorted to without departing from the principle or sacrificing any of the advantages of this invention.

What I claim is—

1. A convertible corn sheller and grater comprising a trough provided at the inner faces of its sides with longitudinal ways, a series of transverse blades mounted in the trough and arranged below the ways, and a detachable grater having laterally extending flanges fitting in the ways of the trough, substantially as described.

2. A convertible corn sheller and grater comprising a trough provided at the inner faces of its sides with longitudinal ways, supporting bars secured within the trough and arranged adjacent to the ways, transverse shelling blades secured to the supporting bars, and a removable grater provided with laterally extending flanges and arranged in the ways of the trough and resting upon the supporting bars, substantially as described.

3. The combination of a trough provided at its bottom with an opening, a screen covering the opening, and a series of shelling blades arranged in the trough, substantially as described.

4. A convertible corn sheller and grater comprising a trough having its sides converging at their lower front ends and provided at their inner faces with longitudinal ways, supporting bars mounted in the trough and arranged adjacent to the ways, shelling blades, and a grater resting upon the supporting bars and arranged in the ways and composed of a bottom plate having its front end conforming to the configuration of the converging portions of the sides and bearing against the same, said back or bottom plate being provided at its sides with ways, and a top portion provided with a grating surface and having laterally extending flanges detachably arranged in the ways of the back or bottom plate, substantially as described.

In testimony that I claim the foregoing as my own I have hereto affixed my signature in the presence of two witnesses.

WILLIAM E. CROCKETT.

Witnesses:
J. H. CLIFTON,
G. F. MUSICK.